United States Patent
Park et al.

(10) Patent No.: US 11,616,252 B2
(45) Date of Patent: Mar. 28, 2023

(54) LITHIUM ION SECONDARY BATTERY AND MANUFACTURING METHOD OF THE SAME

(71) Applicants: HYUNDAI MOTOR COMPANY, Seoul (KR); KIA MOTORS CORPORATION, Seoul (KR)

(72) Inventors: Sang Mok Park, Gwangju-si (KR); Ji Eun Lee, Hwaseong-si (KR); Sung Ho Ban, Hwaseong-si (KR); Yoon Sung Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 202 days.

(21) Appl. No.: 16/691,329

(22) Filed: Nov. 21, 2019

(65) Prior Publication Data

US 2021/0050615 A1    Feb. 18, 2021

(30) Foreign Application Priority Data

Aug. 14, 2019   (KR) .......................... 10-2019-0099456

(51) Int. Cl.
*H01M 10/04* (2006.01)
*H01M 10/0525* (2010.01)
(Continued)

(52) U.S. Cl.
CPC ....... *H01M 10/049* (2013.01); *H01M 4/0404* (2013.01); *H01M 4/133* (2013.01);
(Continued)

(58) Field of Classification Search
CPC .......... H01M 10/049; H01M 10/0525; H01M 4/0404; H01M 4/133; H01M 4/663;
(Continued)

(56) References Cited

U.S. PATENT DOCUMENTS

2006/0204836 A1* 9/2006 Kaito ................... H01M 50/531
429/94
2007/0048613 A1* 3/2007 Yanagida .............. H01M 4/662
429/245
(Continued)

FOREIGN PATENT DOCUMENTS

CN   101431169    *  5/2009   ............ H01M 10/38
CN   101894937    * 11/2010   .............. H01M 4/13
(Continued)

OTHER PUBLICATIONS

English translation of CN101894937.*
English translation of CN101431169.*
English Translation of JP2006147392.*

*Primary Examiner* — Kiran Quraishi Akhtar
(74) *Attorney, Agent, or Firm* — Morgan, Lewis & Bockius LLP (57) ABSTRACT

A lithium ion secondary battery includes: an anode including an anode current collector and an anode coating layer coating a region of the anode current collector; a cathode including a cathode current collector, a cathode coating layer coating a region of the cathode current collector, and an inactive coating layer disposed on a surface of a region of the cathode current collector on which the cathode coating layer is not disposed, the inactive coating layer extending from one or more of both end portions of the cathode coating layer toward an end portion of the anode; and a separation membrane arranged between the cathode and the anode.

7 Claims, 9 Drawing Sheets

(51) Int. Cl.
    *H01M 4/04*     (2006.01)
    *H01M 4/133*     (2010.01)
    *H01M 4/66*     (2006.01)
    *H01M 4/62*     (2006.01)

(52) U.S. Cl.
    CPC ........... *H01M 4/623* (2013.01); *H01M 4/661* (2013.01); *H01M 4/663* (2013.01); *H01M 10/0525* (2013.01)

(58) Field of Classification Search
    CPC ........ H01M 4/623; H01M 4/661; H01M 4/62; H01M 4/668; H01M 4/667
    See application file for complete search history.

(56) References Cited

U.S. PATENT DOCUMENTS

| | | | |
|---|---|---|---|
| 2012/0058375 A1* | 3/2012 | Tanaka | H01M 4/366 429/94 |
| 2013/0122333 A1* | 5/2013 | Obika | H01M 50/531 429/61 |
| 2014/0011064 A1* | 1/2014 | Matsuda | H01M 4/139 429/94 |
| 2017/0279113 A1* | 9/2017 | Ohsawa | H01M 4/667 |

FOREIGN PATENT DOCUMENTS

| | | | | |
|---|---|---|---|---|
| JP | 2006147392 | * | 6/2006 | ............ H01M 10/04 |
| KR | 10-2018-0023634 A | | 3/2018 | |

* cited by examiner

-PRIOR ART-

FIG. 3

IDEAL
CATHODE-ANODE
TOLERANCE

-PRIOR ART-

LITHIUM ION SECONDARY BATTERY AND MANUFACTURING METHOD OF THE SAME

CROSS REFERENCE TO RELATED APPLICATION

The present application claims priority to Korean Patent Application No. 10-2019-0099456, filed Aug. 14, 2019, the entire contents of which is incorporated herein for all purposes by this reference.

TECHNICAL FIELD

The present disclosure relates to a lithium ion battery, and more particularly, to a lithium ion secondary battery capable of improving energy density of a battery cell by preventing a metal layer of a cathode current collector from being exposed and minimizing a tolerance between an anode and a cathode in a punching process of an electrode, by coating some regions of the cathode current collector with an inactive coating layer formed of an electrochemical stable material during an electrode manufacturing process, and a manufacturing method of the same.

BACKGROUND

Recently, the application of lithium ion battery cells to electric vehicles has been expanding, and the demand for high energy density battery cells is increasing to improve one-charging mileage of electric vehicles. In this regard, conventionally, the development is in progress toward designing a cell thickness to be thick, reducing a thickness of an electrode substrate, and reducing a space of a terrace portion in a tap direction in order to increase the number of electrode stacks and current density to increase energy density of the battery cells.

Figure 1:
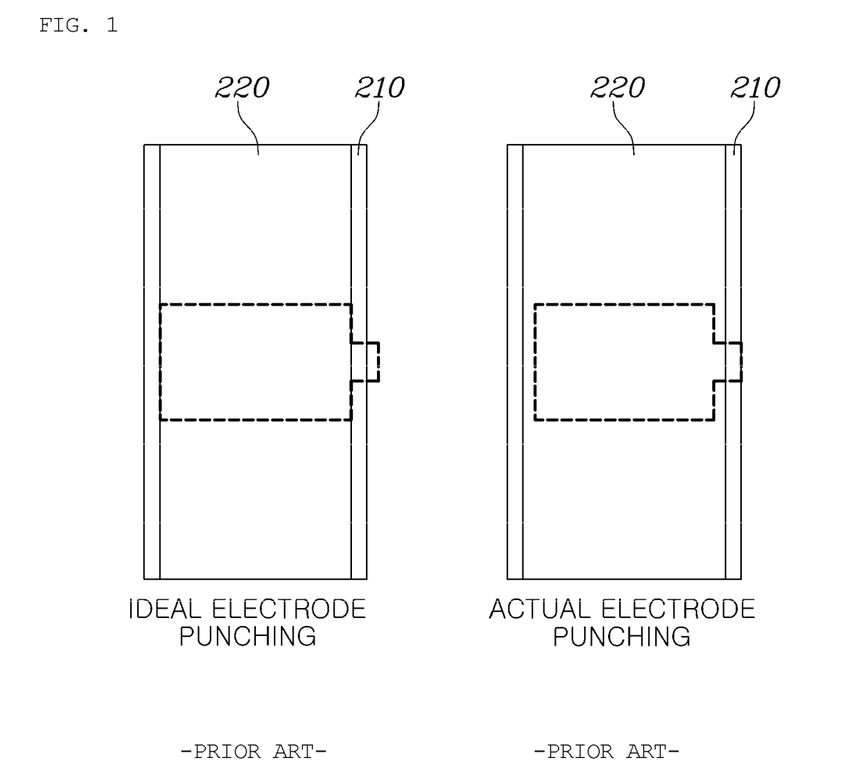
FIG. 1 is a view illustrating figures of an ideal electrode punching and an actual electrode punching in a conventional lithium ion secondary battery.
Figure 2:
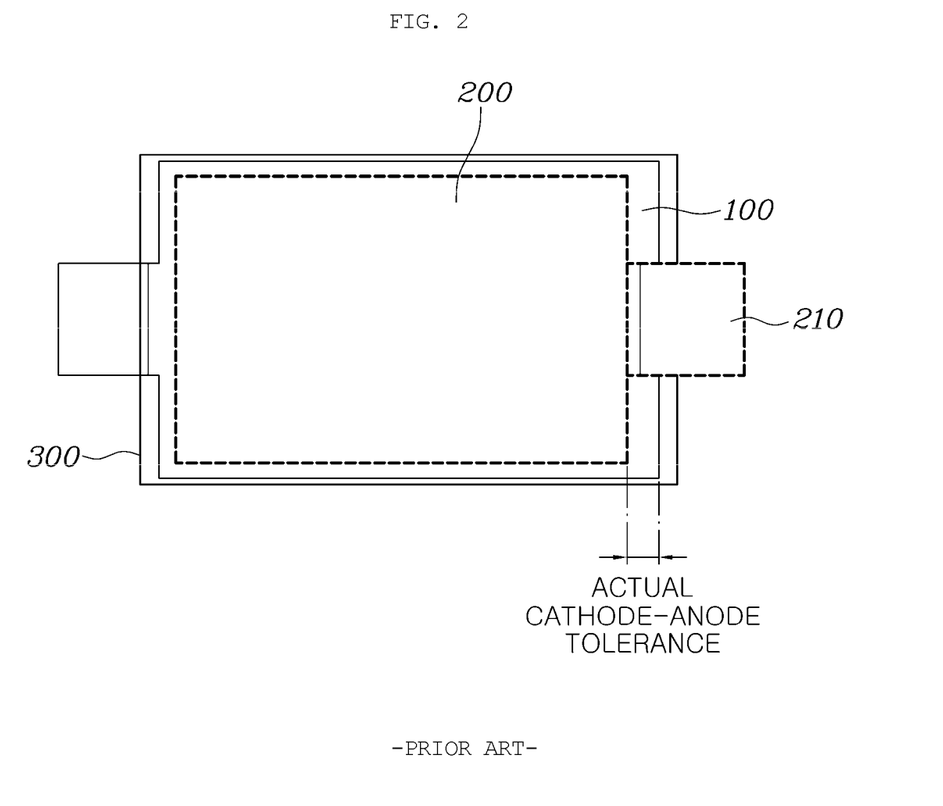
FIG. 2 is a view illustrating a tolerance between an anode and a cathode of a lithium ion secondary battery manufactured by the actual electrode punching.
Figure 3:
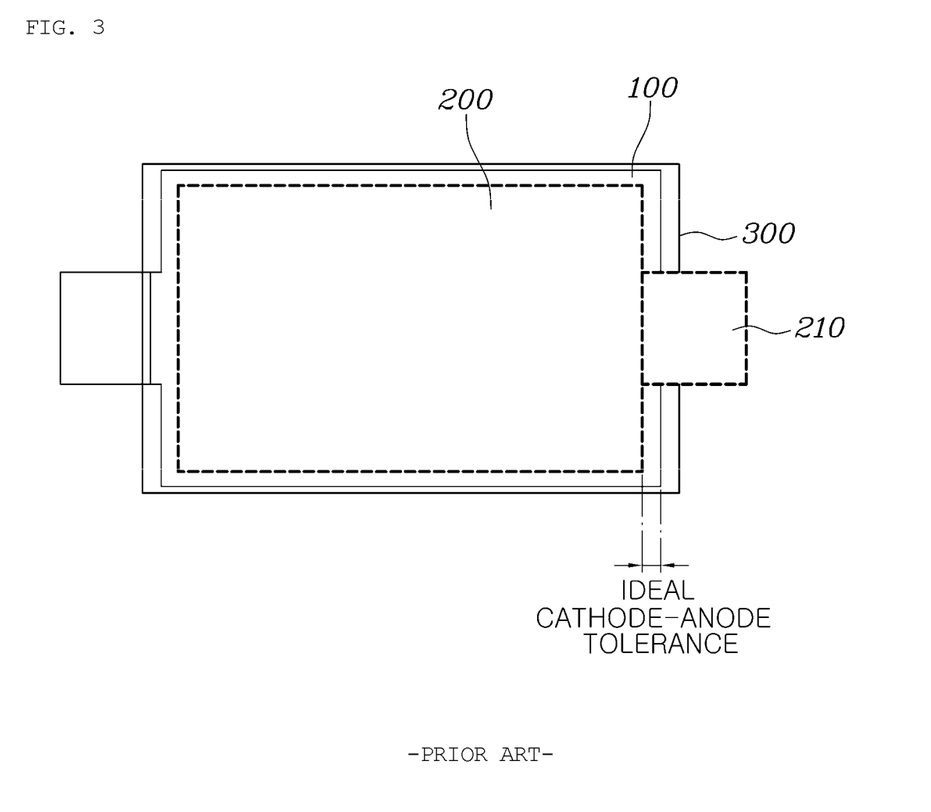
FIG. 3 is a view illustrating a tolerance between an anode and a cathode of a lithium ion secondary battery manufactured by the ideal electrode punching.

In a manufacturing process of the battery cell, an electrode punching process is one of important processes for determining the energy density and reliability of the battery cell. FIGS. 1A and 1B are views illustrating figures of an ideal electrode punching and an actual electrode punching, respectively, in a conventional lithium ion battery (or lithium ion secondary battery), FIG. 2 is a view illustrating a tolerance between an anode and a cathode of a lithium ion secondary battery manufactured by the actual electrode punching, and FIG. 3 is a view illustrating a tolerance between an anode and a cathode of a lithium ion secondary battery manufactured by the ideal electrode punching. Referring to FIG. 1B and FIG. 2, in the conventional actual electrode punching, a method of cutting a cathode coating portion of a predetermined value or more is used in order to prevent a metal surface of a cathode current collector from being exposed even in the event of occurrence of the worst spreading. As a result, however, as the tolerance between the cathode and the anode increases as compared to the case of the ideal electrode punching as illustrated in FIG. 1A and FIG. 3, there was a limit that the energy density is reduced. Further, when the electrode is punched, a punching die may be damaged due to a cathode active material, which is a metal oxide contained in the cathode coating portion, and there was a limit that a material cost is wasted due to the cutting of an expensive cathode active material.

SUMMARY

An object of the present disclosure is to provide a lithium ion secondary (rechargeable) battery capable of improving energy density of a battery cell by preventing a metal layer of a cathode current collector from being exposed and minimizing a tolerance between an anode and a cathode in a punching process of an electrode, by coating some regions of the cathode current collector with an inactive coating layer formed of an electrochemical stable material during an electrode manufacturing process, and a manufacturing method of the same.

According to an aspect of the present disclosure, a lithium ion secondary battery includes: an anode including an anode current collector and an anode coating layer coating a region of the anode current collector; a cathode including a cathode current collector, a cathode coating layer coating a region of the cathode current collector, and an inactive coating layer disposed on a surface of a region of the cathode current collector on which the cathode coating layer is not disposed, the inactive coating layer extending from one or more of both end portions of the cathode coating layer toward an end portion of the anode; and a separation membrane arranged between the cathode and the anode.

The cathode may include a cutting portion formed by a punching process, and a position of the cutting portion may be the same as a position at which the inactive coating layer starts to be formed.

The cutting portion may be included in a region of the inactive coating layer.

A thickness of the inactive coating layer may be equal to or greater than a thickness of the cathode current collector and less than or equal to a thickness of the cathode coating layer.

The inactive coating layer may be formed from one or more of both end portions of the cathode coating layer to the end portion of the anode, and may be foiled up to the end portion of the anode.

The inactive coating layer may be formed from one or more of both end portions of the cathode coating layer to the end portion of the anode, and may externally protrude from the end portion of the anode.

The inactive coating layer may include one or more of a metal oxide, a metal hydroxide, a binder, or a conductive material.

The metal oxide may include one or more of $SiO_2$, $Al_2O_3$, $Al_2(OH)_3$, $TiO_2$, $Mg(OH)_2$, $BaSO_4$, $SnO_2$, $CeO_2$, $ZrO_2$, $BaTiO_3$, $Y_2O_3$, or $B_2O_3$, the metal hydroxide may include one or more of $Al(OH)_3$ or $Mg(OH)_2$, the conductive material may include one or more of carbon nanotube, carbon black, or graphite, and the binder may include one or more of styrene-butadiene (SBR), carboxymethyl cellulose (CMC), polyvinylidene fluoride (Pvdf), polyvinyl alcohol (PVA), polyacrylic acid (PAA), or polyimide (PI).

The inactive coating layer may include one or more of polypropylene (PP), polyethylene (PE), Teflon®, polyethylene terephthalate (PET), or polyimide (PI).

The inactive coating layer may be configured by mixing one or more of polypropylene (PP), polyethylene (PE), Teflon®, polyethylene terephthalate (PET), or polyimide (PI) with one or more of a metal oxide or a metal hydroxide.

According to another aspect of the present disclosure, a manufacturing method of a lithium ion secondary battery includes: preparing an anode including an anode current collector and an anode coating layer coating a region of the anode current collector; preparing a cathode which includes a cathode current collector, a cathode coating layer coating a region of the cathode current collector, and an inactive coating layer disposed on a surface of a region of the cathode current collector on which the cathode coating layer is not disposed, the inactive coating layer extending from one or more of both end portions of the cathode coating layer toward an end portion of the anode; preparing a separation membrane arranged between the cathode and the anode; and stacking the anode, the cathode, and the separation membrane.

The preparing of the cathode may include: coating some regions of the cathode current collector with the cathode coating layer; coating the surface of the cathode current collector on which the cathode coating layer is not folioed with the inactive coating layer; and performing a punching process of the cathode.

DETAILED DESCRIPTION OF THE EMBODIMENTS

Hereinafter, the present disclosure will be described in detail with reference to the drawings. Terms and words used in the present specification and claims are not to be construed as a general or dictionary meaning but are to be construed as meaning and concepts meeting the technical ideas of the present disclosure based on a principle that the inventor can appropriately define the concepts of terms in order to describe their own disclosure in best mode.

Therefore, configurations described in embodiments and the accompanying drawings of the present disclosure do not represent all of the technical spirits of the present disclosure, but are merely exemplary embodiments. Therefore, the present disclosure should be construed as including all the changes, equivalents, and substitutions included in the spirit and scope of the present disclosure at the time of filing the application.

Figure 4:
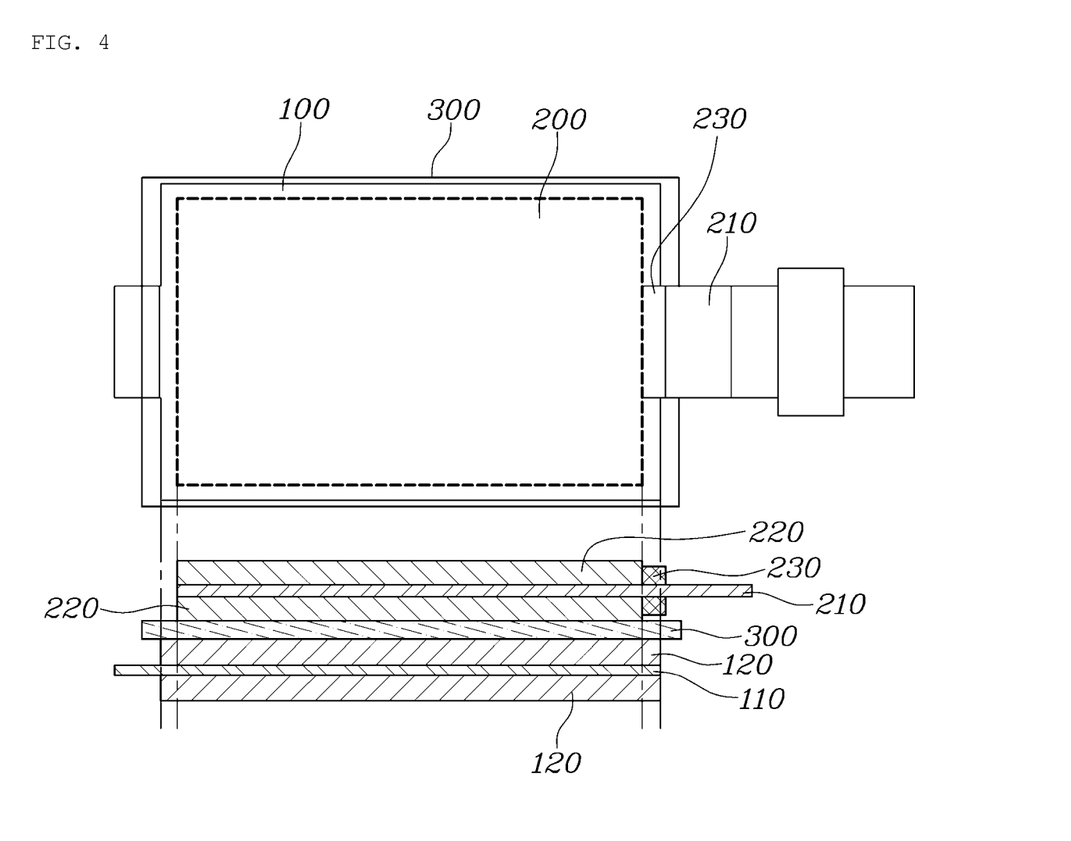
FIG. 4 is a view illustrating a configuration of a lithium ion secondary battery according to an exemplary embodiment of the present disclosure.
Figure 5:
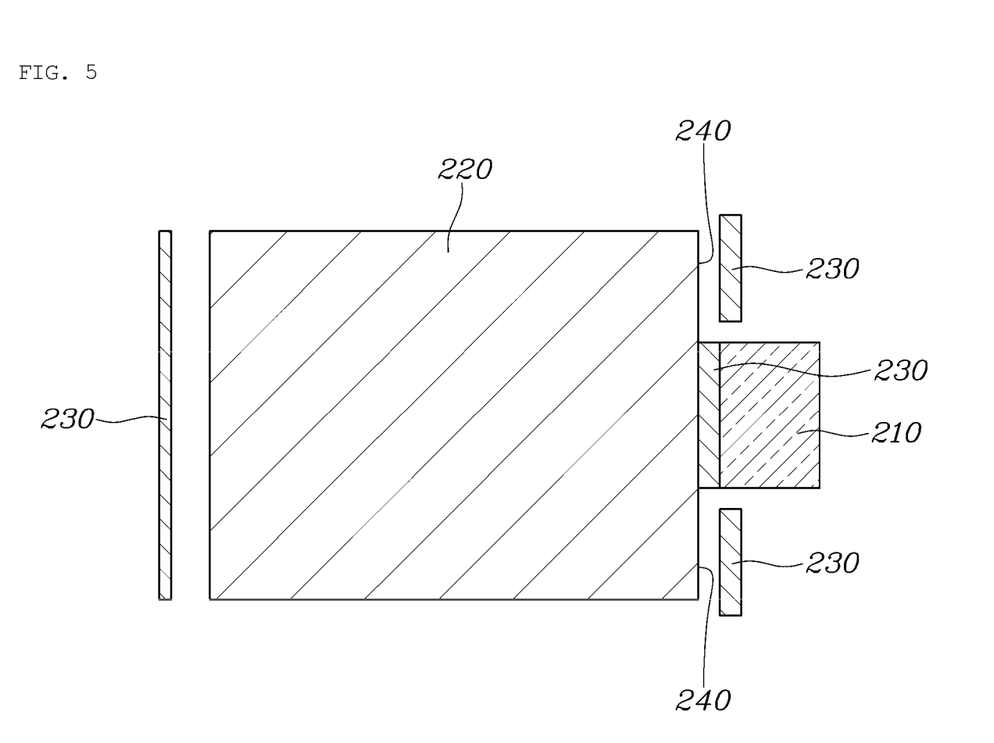
FIG. 5 is a view illustrating a case in which positions of cutting portions are the same as positions at which inactive coating layers start to be folioed in the lithium ion secondary battery according to an exemplary embodiment of the present disclosure.
Figure 6:
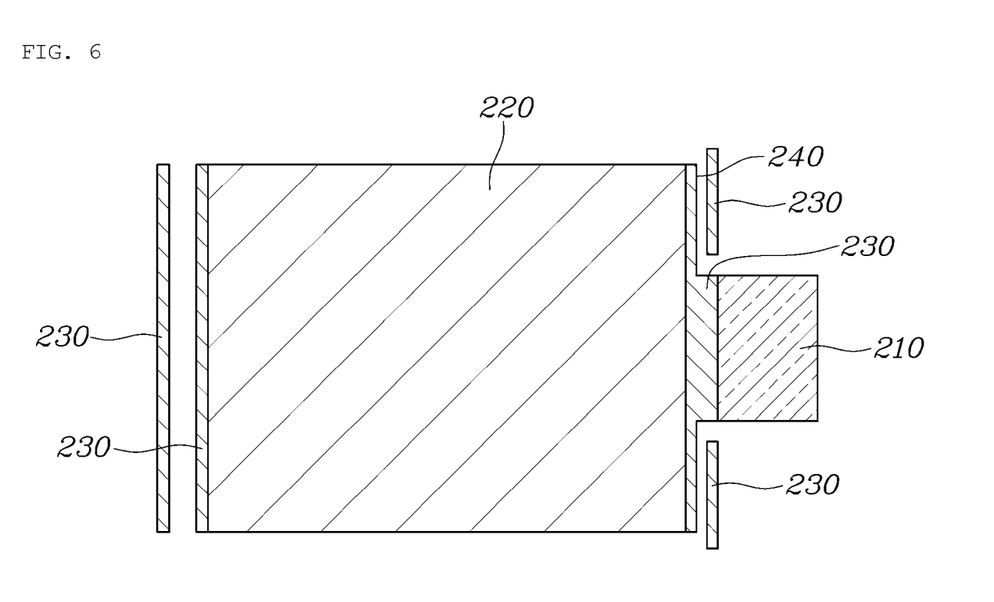
FIG. 6 is a view illustrating a case in which the positions of the cutting portions are included in regions of the inactive coating layers in the lithium ion secondary battery according to an exemplary embodiment of the present disclosure.
Figure 7:
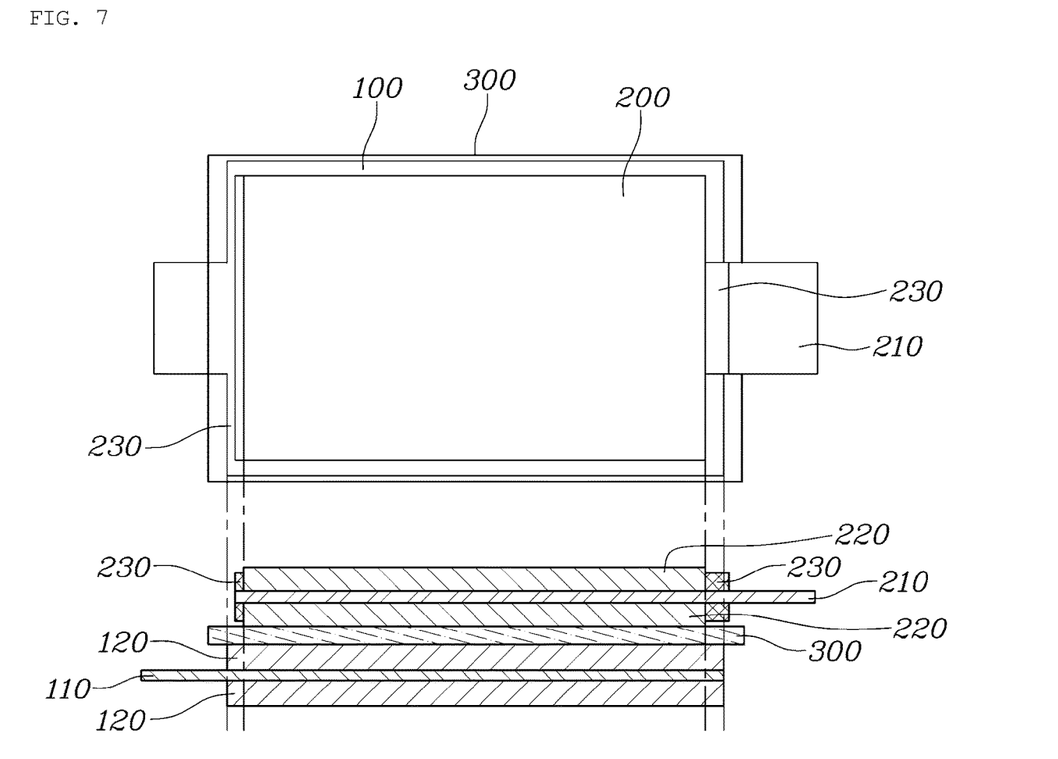
FIG. 7 is a view illustrating a configuration of a lithium ion secondary battery according to another exemplary embodiment of the present disclosure.
Figure 8:
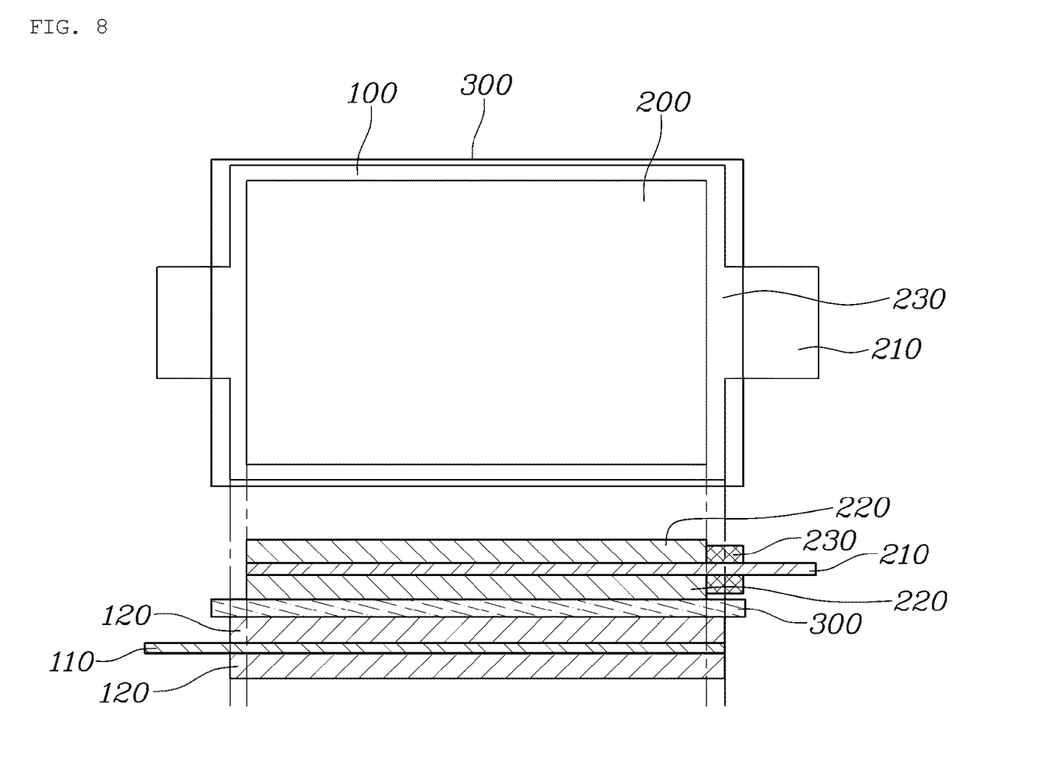
FIG. 8 is a view illustrating a configuration of a lithium ion secondary battery according to still another exemplary embodiment of the present disclosure.

FIG. 4 is a view illustrating a configuration of a lithium ion secondary battery according to an exemplary embodiment of the present disclosure, FIG. 5 is a view illustrating a case in which positions of cutting portions are the same as positions at which inactive coating layers start to be formed in the lithium ion secondary battery according to an exemplary embodiment of the present disclosure, FIG. 6 is a view illustrating a case in which the positions of the cutting portions are included in regions of the inactive coating layers in the lithium ion secondary battery according to an exemplary embodiment of the present disclosure, FIG. 7 is a view illustrating a configuration of a lithium ion secondary battery according to another exemplary embodiment of the present disclosure, and FIG. 8 is a view illustrating a configuration of a lithium ion secondary battery according to still another exemplary embodiment of the present disclosure.

Referring to FIG. 4, a lithium ion secondary battery according to an exemplary embodiment of the present disclosure may include an anode 100, a cathode 200, and a separation membrane 300.

The anode 100 may include an anode current collector 110 and anode coating layers 120 coating some regions of the anode current collector 110. Here, any anode current collector 110 may be used as long as it is a conductor and the anode current collector 110 may be copper, aluminum, stainless steel, nickel plated steel, or the like according to an exemplary embodiment, but is not limited thereto.

The anode coating layers 120 may include an anode active material layer folioed on some regions on the anode current collector 110 and including an anode active material, and a coating layer folioed on the anode active material layer and including one or more of a conductive material and a binder. The anode active material may include a metal-based active material and a carbon-based active material, where the metal-based active material may include a silicon-based active material, a tin-based active material, or a combination thereof, and the carbon-based active material is a material including carbon (atoms) and capable of electrochemically occluding and releasing lithium ions at the same time and may be a graphite active material, artificial graphite, natural graphite, a mixture of artificial graphite and natural graphite, natural graphite coated with artificial graphite, and the like, but is not limited thereto.

The separation membrane 300 is positioned between the cathode 200 and the anode 100 to serve to electrically separate the cathode 200 and the anode 100, and may be folioed as a porous membrane through which ions may move between the cathode 200 and the anode 100.

Hereinafter, the cathode 200 and inactive coating layers 230, which are essential characteristics of the present disclosure, will be described in detail.

The cathode 200 may include a cathode current collector 210, cathode coating layers 220 coating some regions of the cathode current collector 210, and inactive coating layers 230 formed on surfaces of a region of the cathode current collector 210 on which the cathode coating layers 220 are not formed. Further, the cathode 200 may further include cutting portions 240 formed by a punching process. Here, any cathode current collector 210 may be used as long as it is a conductor and the cathode current collector 210 may be aluminum, stainless steel, nickel plated steel, or the like according to an exemplary embodiment.

In addition, the cathode coating layer 220 may include a cathode active material layer folioed on some regions on the cathode current collector 210 and including a cathode active material, and a coating layer folioed on the cathode active material layer and including a conductive material and a binder. Here, the cathode active material is a solid solution oxide including lithium according to the embodiment, but is not particularly limited as long as it is a material capable of electrochemically occluding and releasing lithium ions.

Further, the inactive coating layer 230 may be a coating layer formed of an electrochemical stable material. The inactive coating layer 230 serves to prevent a metal surface of the cathode current collector 210 from being exposed even in a situation in which a work tolerance occurs during a punching process of the cathode 200.

According to an exemplary embodiment, the inactive coating layer 230 may be folioed on the cathode current collector 210 by a method of preparing and coating slurry using a solvent. According to another exemplary embodiment, the inactive coating layer 230 may also be formed on the cathode current collector 210 using a 3D printer. A configuration of the inactive coating layer 230 may vary depending on the method of forming the inactive coating layer 230.

Specifically, when the inactive coating layer 230 is folioed by preparing the slurry using the solvent, the inactive coating layer 230 may include one or more of a metal oxide, a metal hydroxide, a binder, and a conductive material. In this case, the solvent used may be a non-aqueous solvent or an aqueous solvent according to the type of the binder. According to an embodiment, the non-aqueous solvent may be N-methyl-2-pyrrolidone (NMP), dimethylformamide (DMF), dimethylacetamide (DMA), tetrahydrofuran (THF), or the like. Further, the inactive coating layer 230 may include a metal oxide, a metal hydroxide and a binder according to an embodiment, and may include a metal oxide, a metal hydroxide, a binder, and a conductive material according to another exemplary embodiment.

Here, the metal oxide may include one or more of $SiO_2$, $Al_2O_3$, $Al_2(OH)_3$, $TiO_2$, $Mg(OH)_2$, $BaSO_4$, $TiO_2$, $SnO_2$, $CeO_2$, $ZrO_2$, $BaTiO_3$, $Y_2O_3$, and $B_2O_3$. In addition, the metal hydroxide may include one or more of $Al(OH)_3$ and $Mg(OH)_2$. However, this is only one example, and the metal oxide and the metal hydroxide are not limited thereto.

In addition, any conductive material may be used as long as it is an electronic conductive material that does not cause a chemical change in the configured battery. According to an embodiment, the conductive material herein may include one or more of carbon nanotube, carbon black, and graphite. Further, the binder serves to improve adhesion between the inactive coating layer 230 and the cathode current collector 210. According to an exemplary embodiment, the binder may include one or more of styrene-butadiene (SBR), carboxymethyl cellulose (CMC), polyvinylidene fluoride (Pvdf), polyvinyl alcohol (PVA), polyacrylic acid (PAA), and polyimide (PI). However, this is only one example, and any material may be used as the binder as long as it may serve as the binder.

When the inactive coating layer 230 is formed on the cathode current collector 210 using the 3D printer, the inactive coating layer 230 may include one or more of polypropylene (PP), polyethylene (PE), Teflon®, polyethylene terephthalate (PET), and polyimide (PI) according to an embodiment, and may configured by mixing one or more of polypropylene (PP), polyethylene (PE), Teflon®, polyethylene terephthalate (PET), and polyimide (PI) with one or more of a metal oxide and a hydroxide according to another embodiment. Here, the metal oxide may include one or more of $SiO_2$, $Al_2O_3$, $Al_2(OH)_3$, $TiO_2$, $Mg(OH)_2$, $BaSO_4$, $TiO_2$, $SnO_2$, $CeO_2$, $ZrO_2$, $BaTiO_3$, $Y_2O_3$, and $B_2O_3$. In addition, the metal hydroxide may include one or more of $Al(OH)_3$ and $Mg(OH)_2$. However, this is only one example, and the metal oxide and the metal hydroxide are not limited thereto.

A thickness of the inactive coating layer 230 may be equal to or greater than a thickness of the cathode current collector 210 and equal to or less than a thickness of the cathode coating layer 220. A lower cross-sectional view of FIG. 4 illustrates a situation in which the cathode coating layer 220 is ideally coated on the cathode current collector 210. An end portion of the cathode coating layer 220 may not be vertically coated but may be coated to be inclined as illustrated in FIG. 4. In this case, the inactive coating layer 230 may also be coated on the inclined end portion of the cathode coating layer 220. In this case, the sum of the thicknesses of the cathode coating layer 220 and the inactive coating layer 230 may be ideally equal to or less than the maximum thickness of the case in which the cathode coating layer 220 is coated on the cathode current collector 210.

The inactive coating layers 230 may be formed on surfaces of a region of the cathode current collector 210 on which the cathode coating layers 220 are not folioed, as illustrated in FIG. 4. That is, the inactive coating layers 230 may be formed on an upper surface and a lower surface of the region of the cathode current collector 210 on which the cathode coating layers 220 are not formed. In addition, the inactive coating layers 230 may be formed from one or more of both end portions of the cathode coating layers 220 to an end portion of the anode 100. According to an exemplary embodiment, the inactive coating layers 230 may be folioed from both end portions of the cathode coating layers 220 to both end portions of the anode 100 as illustrated in FIG. 7. According to another exemplary embodiment, the inactive coating layers 230 may be folioed from one of both end portions of the cathode coating layers 220 to an end portion of the anode 100 as illustrated in FIG. 8.

Further, according to an exemplary embodiment, the inactive coating layers 230 may be formed from one or more of both end portions of the cathode coating layers 220 to the end portion of the anode 100, and may be formed up to the end portion of the anode 100 as illustrated in FIG. 7.

As such, in the lithium ion secondary battery according to an exemplary embodiment of the present disclosure, the inactive coating layers 230 may prevent an exposure of the cathode current collector 210 to the cutting portions 240 even in a case in which a work tolerance occurs during a punching process, by forming the inactive coating layers 230 from one or more of both end portions of the cathode coating layer 220 to the end portion of the anode 100. In addition, compared to the lithium ion secondary battery manufactured by the actual electrode punching process according to the related art as illustrated in FIG. 2, a tolerance between the anode 100 and the cathode 200 may be minimized, and an area of the cathode 200 may be increased when the same anode 100 is used, by minimizing the tolerance between anode 100 and the cathode 200, thereby improving overall energy density of the battery cell.

Further, conventionally, in accordance with high mixture of electrodes for high energy of the battery cell, dimensionally unstable regions occur due to a difference in the amount of stretching after the electrodes are pressed, and the dimensionally unstable regions remain even after the punching process. As a result, there was a problem that dimensional stability of the battery cell is deteriorated and the dimensionally unstable regions participate in a charge/discharge reaction, which is likely to cause a non-uniform reaction, thereby deteriorating the reliability of the cell. However, according to an exemplary embodiment of the present disclosure, most of the dimensionally unstable regions that may participate in the reaction after the electrode punching process may be removed by forming the inactive coating layers 230 on the dimensionally unstable regions, that is, the end portions of the cathode coating layer 220 as described above, thereby improving the reliability of the cell.

Furthermore, the cathode 200 includes the cathode active material, the binder, and the conductive material. Conventionally, since the electrochemical characteristics are considered as the top priority, the cathode 200 is designed in a direction to minimize the content of the binder, and there were limitations that as the cathode active material is formed of the expensive metal oxide, the cathode active material may damage the punching die at the time of performing the punching process, and an expensive cathode active material is included in a scrap, thereby increasing the material cost.

However, since the inactive coating layers 230 folioed according to an exemplary embodiment of the present disclosure do not consider the electrochemical characteristics, the content of the binder may be increased. Accordingly, it is possible to improve the overall reliability of the cell by preventing problems such as dropping of particles such as the cathode active material and the like from the cutting portions 240 or cracks formed on side surfaces of the cutting portions 240.

The cathode 200 may include the cutting portions 240 folioed by the electrode punching process. In this case, positions of the cutting portions 240 may be the same as positions at which the inactive coating layers 230 start to be formed, as illustrated in FIG. 5. Further, the positions of the cutting portions 240 may be included in regions of the inactive coating layers 230, as illustrated in FIG. 6. In other words, if the cathode 200 is accurately punched at the positions at which the inactive coating layers 230 start to be formed, a cathode 200 as illustrated in FIG. 5 may be manufactured. If the cathode 200 is punched in the regions of the inactive coating layers 230 due to the work tolerance, a cathode 200 as illustrated in FIG. 6 may be manufactured. As such, according to an exemplary embodiment of the present disclosure, the inactive coating layers 230 may prevent the exposure of the cathode current collector 210 to the cutting portions 240 even in a case in which the work tolerance occurs during the punching process, by forming the inactive coating layers 230 from one or more of both end portions of the cathode coating layers 220 to the end portion of the anode 100.

According to another exemplary embodiment, the inactive coating layers 230 may be folioed from one or more of both end portions of the cathode coating layers 220 to the end portion of the anode 100, and may be folioed to externally protrude from the end portion of the anode 100 as illustrated in FIG. 8. As such, in the lithium ion secondary battery according to another exemplary embodiment of the present disclosure, the inactive coating layers 230 are folioed to externally protrude from the end portion of the anode 100 from the end portions of the cathode coating layers 220. As a result, when an impact occurs from the outside, the inactive coating layer 230 absorbs the impact, thereby minimizing damage to the anode, which is a lithium ion acceptor.

Figure 9:
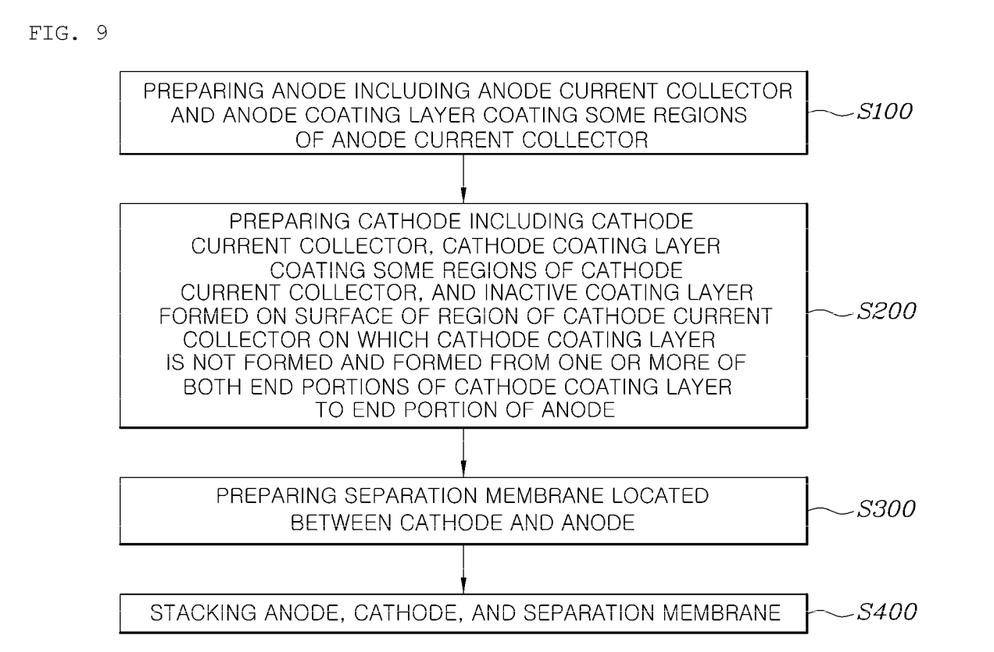
FIG. 9 is a flowchart of a manufacturing method of a lithium ion secondary battery according to an exemplary embodiment of the present disclosure.

FIG. 9 is a flowchart of a manufacturing method of a lithium ion secondary battery according to an exemplary embodiment of the present disclosure. As illustrated in FIG. 9, a manufacturing method of a lithium ion secondary battery according to an exemplary embodiment of the present disclosure may include an operation of preparing an anode including an anode current collector and anode coating layers coating some regions of the anode current collector (S100); an operation of preparing a cathode including a cathode current collector, cathode coating layers coating some regions of the cathode current collector, and inactive coating layers formed on surfaces of regions of the cathode current collector on which the cathode coating layers are not formed and formed from one or more of both end portions of the cathode coating layers to an end portion of the anode (S200); an operation of preparing a separation membrane positioned between the cathode and the anode (S300); and an operation of stacking the anode, the cathode, and the separation membrane (S400).

Further, the operation of preparing a cathode may include an operation of coating some regions of the cathode current collector with the cathode coating layers; an operation of coating the surfaces of the cathode current collector on which the cathode coating layers are not formed with the inactive coating layers; and an operation of performing a punching process of the cathode.

As such, in the manufacturing method of a lithium ion secondary battery according to an exemplary embodiment of the present disclosure, by forming the inactive coating layers before the punching process of the cathode, the inactive coating layers may prevent the cathode current collector from being exposed even in a case in which a work tolerance occurs during the punching process and a tolerance between the anode and the cathode may be minimized, thereby increasing an area of the cathode at the time of using an area of the same anode and as a result, improving energy density of a battery cell.

According to the present disclosure, the energy density of a battery cell may be improved by preventing the metal layer of the cathode current collector from being exposed and minimizing the tolerance between the anode and the cathode in the punching process of the electrode, by coating some regions of the cathode current collector with the inactive coating layer formed of the electrochemical stable material during the electrode manufacturing process, the reliability of the cell may be improved by improving physical characteristics of the cutting portion, and the material cost may be additionally reduced by minimizing loss of the cathode coating layer generated during the punching.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A lithium ion secondary battery comprising:
an anode including an anode current collector and an anode coating layer coating a region of the anode current collector;
a cathode including:
a cathode current collector, a cathode coating layer coating a region of the cathode current collector; and
an inactive coating layer disposed on a surface of a region of the cathode current collector on which the cathode coating layer is not disposed, the inactive coating layer extending from one or more of both end portions of the cathode coating layer toward an end portion of the anode; and
a separation membrane arranged between the cathode and the anode,
wherein a thickness of the inactive coating layer is greater than a thickness of the cathode current collector and less than a thickness of the cathode coating layer,
wherein the inactive coating layer includes a metal hydroxide, wherein the metal hydroxide includes one or more of Al(OH)$_3$ or Mg(OH)$_2$, wherein the cathode includes a cutting portion, and wherein a position of the cutting portion corresponds to a position of the inactive coating layer, and wherein the inactive coating layer externally protrudes from the end portion of the anode.

2. The lithium ion secondary battery of claim 1, wherein the cutting portion is included in a region of the inactive coating layer.

3. The lithium ion secondary battery of claim 1, wherein the inactive coating layer extends from one or more of both end portions of the cathode coating layer to the end portion of the anode.

4. The lithium ion secondary battery of claim 1, wherein the inactive coating layer further includes one or more of a metal oxide, a binder, or a conductive material.

5. The lithium ion secondary battery of claim 4, wherein the metal oxide includes one or more of SiO$_2$, Al$_2$O$_3$, Al$_2$(OH)$_3$, TiO$_2$, Mg(OH)$_2$, BaSO$_4$, TiO$_2$, SnO$_2$, CeO$_2$, ZrO$_2$, BaTiO$_3$, Y$_2$O$_3$, or B$_2$O$_3$, wherein the conductive material includes one or more of carbon nanotube, carbon black, or graphite, and wherein the binder includes one or more of styrene-butadiene (SBR), carboxymethyl cellulose (CMC), polyvinylidene fluoride (Pvdf), polyvinyl alcohol (PVA), polyacrylic acid (PAA), or polyimide (PI).

6. The lithium ion secondary battery of claim 1, wherein the inactive coating layer includes one or more of polypropylene (PP), polyethylene (PE), Teflon®, polyethylene terephthalate (PET), or polyimide (PI).

7. The lithium ion secondary battery of claim 1, wherein the inactive coating layer includes a mixture of one or more of polypropylene (PP), polyethylene (PE), Teflon®, polyethylene terephthalate (PET), or polyimide (PI), and one or more of a metal oxide or a hydroxide.

* * * * *